Figure 1:
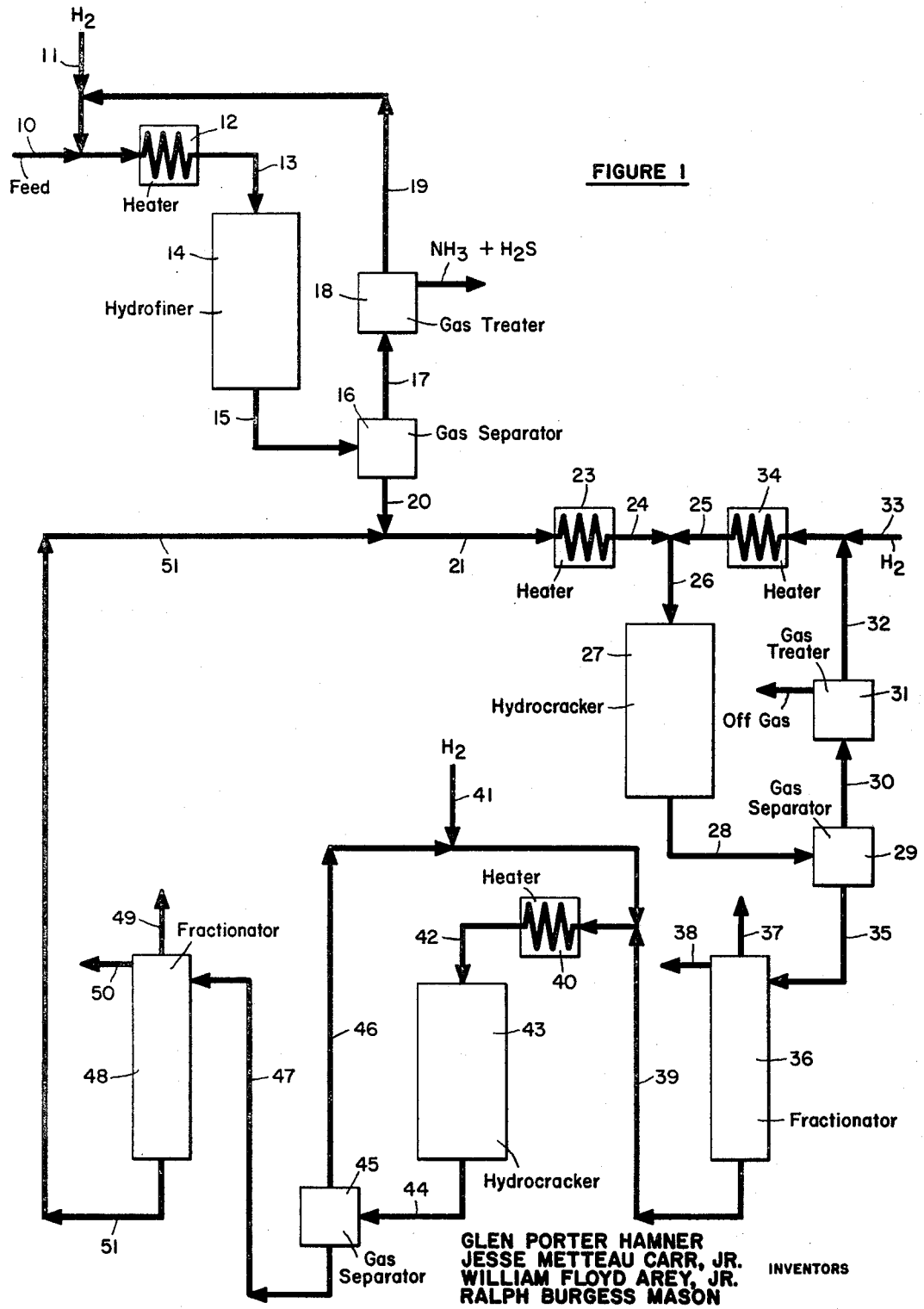

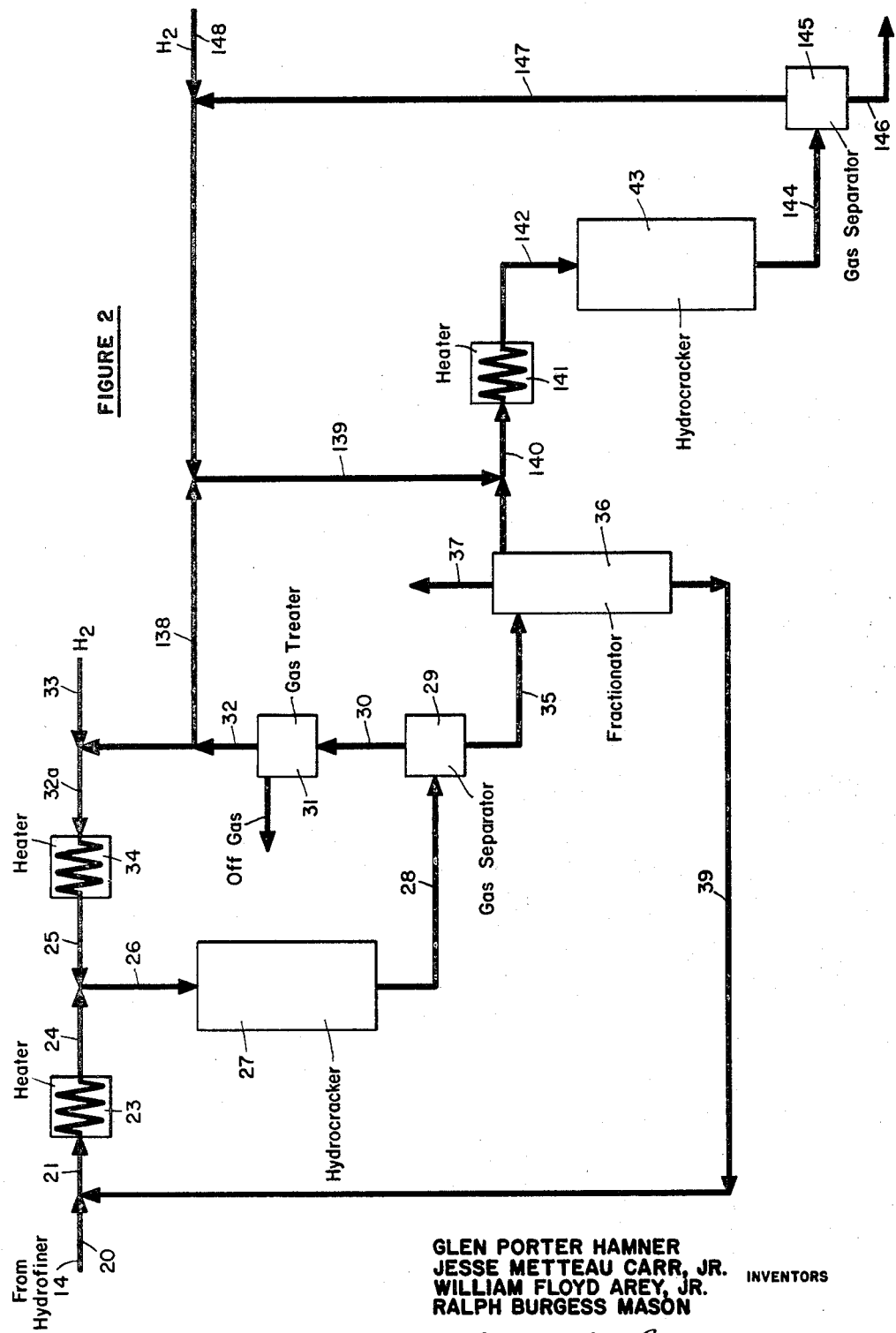

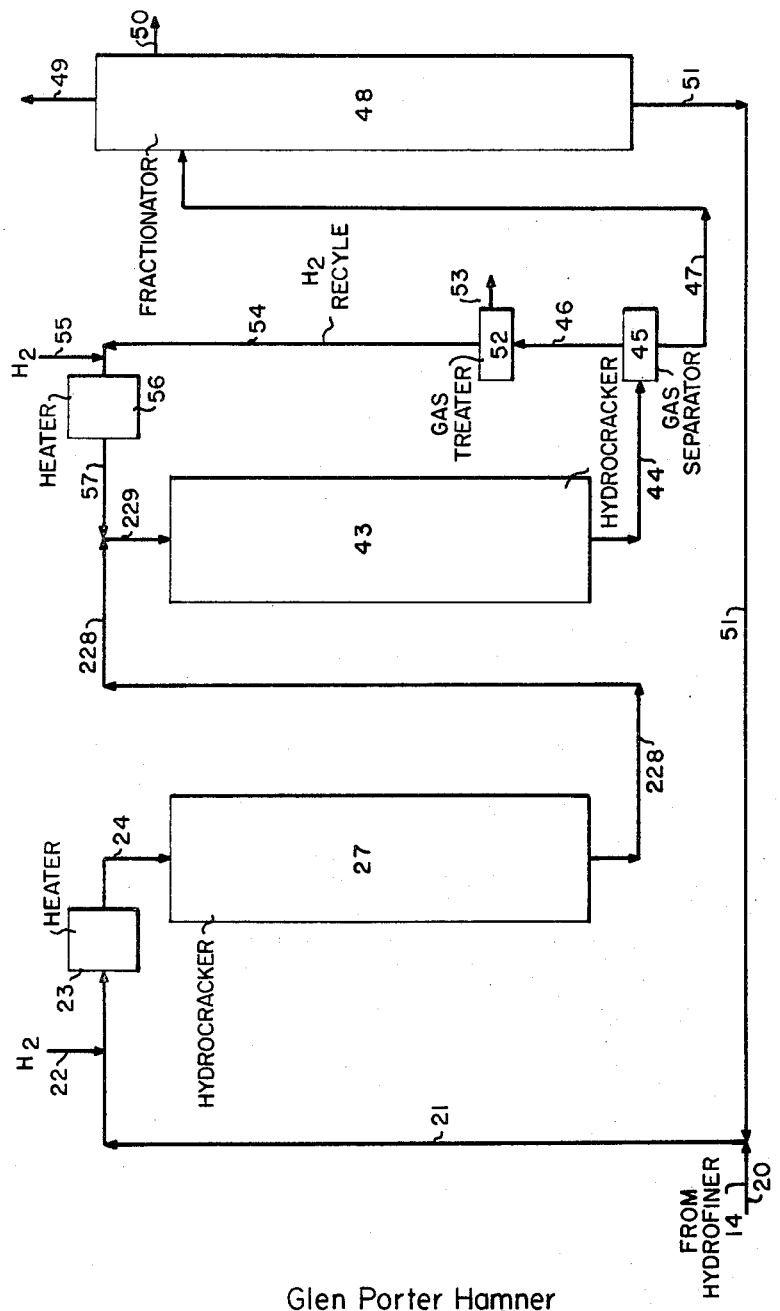

United States Patent Office 3,385,781
Patented May 28, 1968

3,385,781
HYDROCRACKING PROCESS
Glen Porter Hamner, Jesse Metteau Carr, Jr., and William Floyd Arey, Jr., Baton, Rouge, and Ralph Burgess Mason, Denham Springs, La., assignors to Esso Research and Engineering Company, a corporation of Delaware
Filed Apr. 1, 1965, Ser. No. 444,767
17 Claims. (Cl. 208—59)

This invention relates to the catalytic hydrocracking of hydrocarbons. Particularly, it relates to the selective hydrocracking of a previously hydrocracked feed or a portion thereof. More particularly, the invention relates to a two-stage hydrocracking process utilizing crystalline alumino-silicate zeolite catalyst in each stage wherein the first stage contains a relatively large pore zeolite and the second stage contains a relatively small pore zeolite.

Considerable attention within the petroleum industry has recently been directed to hydrocracking because of certain particularized adavntages it offers over conventional catalytic cracking, e.g. lower gas and coke yields and higher yields of good quality liquid products. The renewed interest in hydrocracking may be largely attributed to the recent development of markedly improved hydrocracking catalysts which contain a crystalline alumino-silicate zeolite as the catalyst support for a hydrogenation component. Numerous recent patents are directed to the use of this new catalyst base which has been found to be much less sensitive to feed impurities, e.g. nitrogen compounds, and exhibits a considerably higher degree of selectivity to desired products, e.g. gasoline, than the conventional amorphous type catalysts previously employed.

The property which is believed responsible for the unique attributes of crystalline alumino-silicate zeolites in their use as conversion catalysts is the uniform dimensions of their pore openings which is caused by a highly ordered crystalline structure. Because of the ability of these zeolite materials to selectively adsorb molecules on the basis of their size and shape, they have often been referred to as "molecular sieves." The various types of molecular sieves may be classified according to the size of the molecules which will be rejected (i.e. not adsorbed be a particular sieve) which of course will be directly related to the diameter of the pore openings. These zeolite materials have been extensively described in the patent literature; for example, U.S. Patents Nos. 3,013,982–86 describe a number of synthetic zeolites, and designate them as zeolites A, D, L, R, S, T, X and Y.

In general, those crystalline alumino-silicate zeolites which have been found useful in hydrocracking processes are represented by the following molar formula:

$$0.9 \pm 0.2 M_{2/n}O : Al_2O_3 : xSiO_2$$

wherein M is selected from the group consisting of metal cations and hydrogen, $n$ is its valence, and $x$ is a number from about 1.5 to about 12. They will usually have uniform pore openings of about 6 to 15, preferably 10 to 13, Angstrom units in diameter. The processes for producing these materials are well known in the art. They typically involve crystallization from reaction mixtures containing alumina, silica, alkali metal oxide, and water, all supplied by suitable source materials. A type of synthetic zeolite which has recently gained wide acceptance as a hydrocracking catalyst support because of its greater stability and higher activity is the synthetic faujasite variety, wherein $x$ in the above formula is about 2.5 to 7, preferably 3 to 6, most preferably 4 to 5.5. This material has a crystal structure similar to the natural mineral faujasite and can be prepared by the procedure described in U.S. Patent No. 3,130,007 which refers to it as "zeolite Y." Other types of zeolitic materials have also been found useful in hydrocracking processes. For example, synthetic mordenite has the capability of admitting aromatics into its pores, and will therefore be suitable.

For use as catalytic agents suitable in hydrocarbon conversion processes such as hydrocracking, the zeolites are usually subjected to cation exchange to reduce their alkali metal oxide content to less than about 10 wt. percent, preferably less than about 5 wt. percent. Conventionally, the alkali metal oxide content has been reduced by ion exchange treatment with solutions of ammonium salts, or salts of metals in Groups I to VIII or the rare earth metals, preferably metals in Groups II, III, IV, V, VI–B, VII–B, VIII and the rare earth metals. Mixtures of these cations have also been employed. For hydrocracking purposes, the hydrogen and/or magnesium form of these zeolites has been preferred. After suitable ion exchange, the modified crystalline zeolite is composited with a metallic hydrogenation component such as a platinum group metal for use as a hydrocracking catalyst. This may be accomplished by treatment with a platinum or palladium salt or ammonium complex, e.g. platinous tetraaminodichloride, ammonium chloroplatinate, palladium chloride, etc. The amount of hydrogenation metal in the finished catalyst is ordinarily between 0.01 and 5.0 wt. percent, preferably 0.1 to 3.0 wt. percent, based on the zeolite. Normally, the catalyst is then subjected to a heat or hydrogen treatment at elevated temperaures, e.g. 500° to 1500° F., to reduce the platinum group metal, at least in part, to its elemental state.

While the use of the above catalyst has proved highly successful in the hydrocracking of various feedstocks, particularly gas oils, there still remains the desirability for improving the quality of certain fractions in the hydrocracked product. It is customary, for example, to upgrade naphtha fractions in the hydrocracked product by such processes as thermal reforming, catalytic reforming cracking, etc., for use in the high quality motor gasolines demanded by modern automobiles. The extent of purification and conversion of naphtha and naphtha-containing oils is, however, limited with these conventional upgrading techniques owing to excessive gas and coke make as reaction temperature increases. If the gas and coke make is curtailed, a corresponding limitation on the degree of naphtha improvement accrues. Indiscriminate use of cracking processes to upgrade naphtha may also be self-defeating since lower boiling products are produced.

It is therefore the general purpose of the present invention to provide a process for upgrading a previously hydrocracked feed stream or a portion thereof so as to recover enhanced quality product. Hydrocracking of the original feed stream can be accomplished with any of the conventional hydrocracking catalysts such as sulfides of nickel, molybdenum, tungsten, cobalt, etc., or the noble metal on silica-alumina type catalysts. It will, however, be preferred that the feed stream be initially hydrocracked with a relatively large pore crystalline zeolite hydrocracking catalyst of the type hereinbefore described; preferably of the synthetic faujasite variety having a silica to alumina mole ratio above about 3, having been base-exchanged with a hydrogen-containing and/or an alkaline earth metal cation to reduce its alkali metal content to less than about 10%, preferably less than about 5%, and having been combined with a platinum group metal, e.g. palladium. (By "alkaline earth metal" is meant such metals as calcium, magnesium, etc. By "platinum group metal" is meant metals in the platinum or palladium series of the Periodic Table.) As hereinbefore mentioned, this type of catalyst will have a relatively large pore size, e.g. about 10 to 13 A., and will readily admit cyclic and branched-chain hydrocarbons as well as straight-chain hydrocarbons in the feed streams contemplated. As such, this initial hydrocracking treatment will be essentially non-selective in nature.

It is a more specific purpose of the invention to provide a two stage hydrocracking process preferably utilizing the aforedescribed relatively large pore crystalline zeolite catalyst in the first stage, and a relatively small pore crystalline zeolite catalyst in the second stage to upgrade either the total hydrocracked product from the first stage, or a specific portion thereof, by selectively hydrocracking objectionable materials contained therein. The second stage thus substitutes for the aforementioned reforming or cracking techniques without the disadvantages attendant thereto. The second stage relatively small pore selective hydrocracking catalyst is capable of selectively converting straight chain hydrocarbon molecules to removable lower boiling products, such as $C_4-$ gases. The purpose of removing the straight chain hydrocarbons may be various; e.g. to increase octane rating, lower pour point, etc.; i.e. in any instance where their presence might be objectionable or their absence beneficial.

The selective hydrocracking catalyst comprises a crystalline metallo alumino-silicate zeolite having relatively small uniform pore openings of about 4 to less than 6 A., preferably about 5 A., which zeolite contains a polyvalent, difficulty reducible cation as will be hereinafter described, and which additionally is combined with a suitable metallic hydrogenation component. The crystalline metallo alumino-silicate zeolites having uniform pore openings of about 5 A., contemplated for use in this invention are well known and available in synthetic or natural form. For example, a suitable starting material, referred to as "zeolite A" in U.S. Patent 2,882,243, has a molar formula of (dehydrated form) of

$$1.0 \pm 0.2 M_{2/n}O : Al_2O_3 : 1.85 \pm 0.5 SiO_2$$

where M is a metal usually sodium and $n$ is its valence. It may be prepared by heating a mixture containing $Na_2O$, $Al_2O_3$, $SiO_2$, and $H_2O$ (supplied by suitable source materials) at a temperature of about 100° C. for 15 minutes to 90 hours or longer. Suitable ratios of these reactants are fully described in the aforementioned patent.

One suitable process for preparing such materials synthetically involves, for example, the mixing of sodium silicate, preferably sodium metasilicate, with sodium aluminate under carefully controlled conditions. The sodium silicate employed should have a ratio of soda to silica between about 0.8 to 1 and about 2 to 1, and the sodium aluminate may have a ratio of soda to alumina in the range of from about 1 to 1 to about 3 to 1. The amounts of the sodium silicate and sodium aluminate solutions employed should be such that the ratio of silica to alumina in the final mixture ranges from about 0.8 to 1 to about 3 to 1 and preferably from about 1 to 1 to about 2 to 1. Preferably, the aluminate is added to the silicate at ambient temperature with sufficient agitation to produce a homogeneous mixture. The mixture is then heated to a temperature of from about 180° to about 215° F. and held at that temperature for a period of from about 0.5 to about 3 hours or longer. The crystals may be formed at lower temperatures but longer reaction periods will be required. At temperatures above about 250° F. a crystalline composition having the requisite uniform size pore openings is not obtained. During the crystallization step, the pH of the solution should be maintained on the alkaline side, at about 12 or higher. At lower pH levels, crystals having the desired properties are not as readily formed.

The products produced by the above procedure will have uniform pore openings of about 4 A. as produced in the sodium form. They may then be converted to products having uniform pore openings of about 5 A. by replacement of the sodium via conventional ion-exchange techniques with various cations such as calcium, magnesium, cobalt, nickel, iron, manganese, zinc, etc., all of which are not suitable for purposes of this invention.

Natural zeolites having effective pore diameters of about 5 A. are also herein contemplated and will include such materials as erionite, chabazite, analcite, mordenite, lebrynite, natrolite, etc. Thus, both the natural and synthetic varieties of 5 A. zeolites are contemplated with the only limitation being one of pore size. As indicated, the pore size must be sufficient to substantially admit the straight chain hydrocarbons but insufficient to admit the cyclic and branched-chain hydrocarbons, such as aromatics, so as to avoid their hydrocracking. This capacity should, therefore, be demonstrated at the particular hydrocracking conditions contemplated, since the effective pore diameter of these zeolite materials often varies with temperature and pressure.

In accordance with the invention, it has been found that indiscriminate use of the above-mentioned cations is not suitable for the selective hydrocracking process of the invention. More particularly, it has been found that the cation utilized must specifically be a polyvalent, difficultly reducible cation. By "difficultly reducible" is meant a cation which is not reducible to a lower valence state or to the free metal by hydrogen at the hydrocracking conditions utilized. Of the above-mentioned cations, zinc cation is especially preferred. Thus, the relatively small pore crystalline zeolite catalyst used in the present invention is prepared from a crystalline alumino-silicate which after ion exchange with a desired cation solution will have uniform pore openings preferably about 5 A. in diameter. The most preferred cation solutions will contain zinc cations; e.g. aqueous solutions of zinc salts such as zinc chloride, zinc acetate, etc., which can contain other cations as well. The extent of ion exchange should be sufficient to reduce the alkali metal, e.g. sodium, content of the zeolite to less than 10 wt. percent, and preferably less than 5 wt. percent. The ion exchange is preferably conducted to cause at least 25%, and more preferably greater than 50%, of the exchangeable cation content to be divalent, e.g. by replacement with the preferred zinc cation. Although the most preferred catalysts will be prepared by using zinc cation as the sole exchanging cation, the presence of zinc together with other exchanging cations will also be highly useful. Thus, the present invention contemplates the use of a 5 A. zeolite preferably containing zinc cation. Preferably the zeolite will have a major portion of its cation content supplied by zinc with perhaps minor portions of residual sodium as well as minor portions of other ions which may also have been introduced via ion exchange for various purposes.

As a further step in the preparation of the catalysts of the invention, the catalyst is combined with an active metallic hydrogenation component which may be chosen from Groups V–B, VI–B, VII–B or VIII of the Periodic Table and which is suitably exemplified by the metals cobalt, nickel, platinum, palladium, etc. The hydrogenation component may be in the form of the free metal as in the case of platinum group metals, or as the oxide or sulfide as in the case of cobalt, etc., or mixtures of such metals, oxides or sulfides. Platinum group metals (i.e. metals of the platinum and palladium series) will be preferred for purposes of the present invention, with palladium being particularly preferred. Incorporation of the hydrogenation component may be accomplished by any conventional technique such as ion exchange followed by reduction, impregnation, etc. When palladium is employed, the exchanged alumino-silicate is preferably impregnated with an ammoniacal solution of palladium chloride sufficient to produce the desired amount of hydrogenation metal in the final product, and then dried and calcined at a temperature of 800° to 1000° F. Reduction of the metal is then accomplished either separately or in the hydrocracking reaction per se. The amount of hydrogenation component may range from about 0.1 to about 25 wt. percent based on the weight of final product. In the case of platinum group metals, e.g. palladium, the preferred amount will be in the range of about 0.1 to 2, e.g. 0.3 to 1.0 wt. percent based on dry catalyst.

As an additional preferred embodiment of the present invention, it has been found that the activity and effectiveness of the relative small pore selective hydrocracking catalysts used herein may be substantially improved by contact with sulfur. The catalyst is preferably sulfactivated to enhance its activity by contact either with a sulfur-containing feed or, if the feed has a low sulfur content, with hydrogen sulfide or an added sulfur compound which is readily convertible to hydrogen sulfide at the hydro conditions employed, e.g. carbon disulfide, etc. The extent of this sulfactivation treatment should be sufficient to incorporate 0.5 to 15 wt. percent sulfur into the catalyst. The beneficial effect of sulfactivation is observed regardless of the sulfur content of the feedstock being processed; i.e. even with feedstocks containing negligible sulfur.

In brief compass, one aspect of the present invention involves the hydrocracking of a previously hydrocracked feedstock or portion thereof, which contains a substantial quantity of naphtha fractions, with a selective hydrocracking catalyst of the type described above in order to obviate the need for conventional upgrading processes such as reforming, to thereby produce a higher octane product. In other aspects, the present invention is directed to a two-stage hydrocracking process wherein the first stage is conducted in the presence of a relatively large pore size catalyst, particularly a crystalline zeolite base containing a platinum group metal as hereinbefore described, and wherein the second stage contains a relatively small pore size crystalline zeolite catalyst, e.g. 5 A., which selectively converts objectionable materials, such as low octane-producing straight-chain molecules in the naphtha fractions, to thereby cause a marked improvement in octane rating. By relatively large pore size is meant a pore size of about 6 A. and greater. By relatively small pore size is meant a pore size of between 4 A. and less than about 6 A., e.g. 5 A. As previously mentioned, the total hydrocracked product from the first stage may be contacted with the second-stage selective hydrocracking catalyst, or a specific fraction of the first-stage product may be so contacted. When the total first-stage hydrocracked product is introduced directly to the second selective hydrocracking stage, naphtha fractions in the second-stage effluent are separated from higher boiling material by fractionation and the latter is recycled to the first stage having the large pore catalyst. Alternatively, a specific fraction of the first-stage effluent can be sent to the second stage. In this case, the first-stage effluent is fractionated and only the specific fraction, e.g. naphtha, middle distillate, bottoms, etc., is then selectively hydrocracked in the second stage. These alternatives will be hereinafter more particularly described with reference to the accompanying drawings. Various other alternatives are also available, as will be apparent to those skilled in the art. For example, it may be desirable to remove hydrogen sulfide and ammonia gases produced in the first hydrocracking stage prior to processing the naphtha product or the total hydrocracked product stream in the second hydrocracking stage. Alternatively, because the second-stage catalyst is preferably activated by sulfur, it will often be convenient to separate only the ammonia and to use a recycle hydrogen stream containing hydrogen sulfide.

The feedstocks contemplated for use in the present invention may be any of the typical petroleum hydrocarbon feeds, containing a substantial portion of straight chain hydrocarbons which are desirably removed for the particular intended use of the end product. In one embodiment the feed to the second selective hydrocracking stage will include low boiling naphtha or high boiling naphtha-containing feeds, the latter typically having a boiling range of about 250 to 450, preferably 300° to 430° F. These feeds may be exemplified by virgin naptha fractions, heavy coker naphtha, heavy steam cracked naphtha, heavy catalytic naphtha, and the like. In its more specific aspects, suitable feeds to the first hydrocracking stage will include whole crudes, virgin and cracked light and heavy gas oils, including coker gas oil, cycle oils from catalytic or thermal cracking or fractions thereof, etc., as well as the 430° F. recycle bottoms from the second or subsequent stages. Where the feed to the first stage has a high nitrogen content, hydrofining prior to contact with the first hydrocracking stage catalyst will be preferred.

The present invention should be distinguished from prior art conversion processes which, as previously mentioned, have recognized the utility of crystalline zeolite catalysts and catalyst supports. The present invention differs from these prior processes by combining the unique abilities of two different pore size crystalline zeolite catalysts. By utilizing the selective hydrocracking ability of a crystalline zeolite catalyst having a relatively small pore size as part of the hydrocracking system, a unique combination of conventional hydrocracking and selective hydrocracking is employed to achieve superior results.

The conditions used in the hydrocracking stages of the process of the invention will be as follows:

(1) In the first hydrocracking stage containing the relatively large pore size crystalline alumino-silicate zeolite catalyst: a temperature of from about 400° F. to 800° F., preferably 500° F. to 750° F.; a pressure of from about 250 to 2500 p.s.i.g., preferably 500 to 1500 p.s.i.g.; a liquid hourly space velocity of from about 0.2 to 2, preferably 0.5 to 1.5 volumes of feed per volume of catalyst per hour; and a hydrogen feed rate of from about 1000 to about 20,000, preferably 3000 to 8000, s.c.f./bbl. of feed;

(2) In the second hydrocracking stage using the relatively small pore size crystalline alumino-silicate zeolite selective hydrocracking catalyst: a temperature of from about 650° F. to 900° F., preferably 700° F. to 850° F.; a pressure of from about 200 to 2500 p.s.i.g., preferably 500 to 1500 p.s.i.g.; a liquid hourly space velocity of from about 0.2 to 2, preferably 0.3 to 1.0 volume of feed per volume of catalyst per hour; and a hydrogen feed rate of from about 1000 to about 10,000, preferably 1500 to 5000, s.c.f./bbl. of feed. It will be most preferable to operate both stages at essentially the same pressure.

The process of the present invention will now be described in further detail, with reference being made to the accompanying drawings which are simplified flow diagrams of preferred embodiments of the process of the invention. In all cases, a hydrofining zone is shown and will be preferred with nitrogen-containing feedstocks. It will be understood, however, that the hydrofining stage may be eliminated if the feed is essentially nitrogen-free.

FIGURE 1 illustrates one embodiment of the process of the invention wherein naphtha fractions are fractionated from the first stage hydrocracker effluent, and the fractionator bottoms (e.g. material boiling above about 430° F.) are introduced to the second-stage selective hydrocracking. The second stage effluent is also fractionated to separate naphtha fractions, and the fractionator bottoms are recycled back to the large pore catalyst in the first stage. Referring to FIGURE 1, a suitable oil feed charge is introduced through line 10 and is mixed with hydrogen being introduced through line 11. The resulting admixture of feed and hydrogen is heated to hydrofining temperature in heater 12, and passed through line 13 into hydrofiner 14, where it flows downwardly over any of the conventional hydrofining catalysts, such as cobalt molybdate on alumina. The hydrofining operating conditions are determined by the nitrogen content of the feed charge and will be sufficient to reduce the nitrogen content to within the desired range without substantial conversion of the hydrocarbons in the feed. In hydrofiner 14, the nitrogen-containing and sulfur-containing compounds in the feed are substantially converted to ammonia and hydrogen sulfide, respectively. The total effluent from hydrofiner 14 containing excess hydrogen, hydrogen sulfide, ammonia and substantially unconverted liquid petroleum hydrocarbon fractions is withdrawn through line 15, and passed to gas separator 16, to separate the gaseous phase from the liquid phase. The gaseous phase, including hydrogen, ammonia and hydrogen sulfide, passes through line 17 into gas treater 18, wherein hydrogen sulfide and ammonia are removed by scrubbing or other suitable means. The remaining gas stream composed substantially of hydrogen is recycled to the system via line 19 which joins line 11. Alternatively, the hydrogen sulfide and ammonia may be removed by a gas treater in line 15. If it is desired to utilize the hydrogen sulfide for sulfactivation of the catalyst in hydrocracker 43, it may be further separated from the ammonia and sent to the gas recycle system associated with hydrocracker 43.

The essentially unconverted liquid petroleum stream is withdrawn from gas separator 16 through line 20, and passed via line 21 into heater 23, wherein it is heated to hydrocracking temperature. The heated liquid stream passes through line 24, mixes with a heated hydrogen stream flowing through line 25, and the combined stream of hydrogen and hydrofined oil enters hydrocracker 27 through line 26, where it flows downwardly over the relatively large pore crystalline zeolite hydrocracking catalyst of the type hereinbefore described. The hydrocracking operating conditions in hydrocracker 27 are sufficient to obtain the desired degree of conversion per pass. The effluent stream from hydrocracker 27 is withdrawn through line 28, and passes to gas separator 29, which serves to separate the liquid and gaseous phases. The gaseous phase containing hydrogen, and minor amounts of ammonia and hydrogen sulfide leaves gas separator 29 through line 30 and passes to gas treater 31, where the ammonia and/or hydrogen sulfide can be removed by scrubbing or other suitable means. Again, hydrogen sulfide may be sent to hydrocracker 43, if desired. The use of gas treater 31 is optional depending upon the amounts of ammonia and hydrogen sulfide in the recycle gas. The gas stream composed substantially of hydrogen is then recycled through line 32, along with make-up hydrogen being introduced through line 33. The combined hydrogen stream is heated to the desired operating temperature in heater 34, passes through line 25, and joins with the hydrofined oil feed in line 26 as hereinbefore described. The use of heater 34 is optional.

Liquid petroleum products are withdrawn from the bottom of gas separator 29 through line 35, and are conducted to fractionator 36, wherein light hydrocarbons ($C_4$ and lighter) and gases are removed as overhead through outlet 37. Naphtha fractions are withdrawn from fractionator 36 through line 38. The fractionator bottoms product (e.g. boiling above about 430° F.) is withdrawn through line 39, joins with hydrogen from line 46 and passes through heater 40 and line 42 into hydrocracker 43. Recycle hydrogen flows through line 46 and make-up hydrogen through line 41. Hydrocracker 43 contains the relatively small pore crystalline zeolite selective hydrocracking catalyst of the type hereinbefore described. The operating conditions in hydrocracker 43 are within the ranges previously described and are sufficient to obtain the desired degree of selective hydrocracking of straight chain hydrocarbons. The effluent from hydrocracker 43 is withdrawn through line 44, and passes to gas separator 45 which serves to separate the liquid and gaseous phases. The separated hydrogen stream is recycled to hydrocracker 43 via line 46. The liquid products from gas separator 45 are conducted via line 47 to fractionator 48, wherein light hydrocarbons ($C_4$ and lighter) are removed as overhead through line 49, and the naphtha product is removed through line 50. The bottoms product from fractionator 48 is withdrawn through line 51 and recycled back to hydrocarcker 27 after joining with the hydrofined feed stream from line 20. The process is thus characterized by a recycle to extinction of the fractionator 48 bottoms which are ultimately converted to lower boiling product.

FIGURE 2 illustrates another embodiment of the process of the invention wherein naphtha fractions are fractionated from the first stage hydrocracker effluent and directly introduced into the second stage selective hydrocracking, with the higher boiling material from the first-stage effluent being recycled back to the large pore catalyst in the first stage. Referring to FIGURE 2, which illustrates only the hydrocracking section of the process, the hydrofining section being the same as illustrated in FIGURE 1, the hydrofined oil stream combines with hydrogen and passes into hydrocracker 27 in the same manner as illustrated in FIGURE 1. The effluent stream from hydrocracker 27 is separated into liquid and gaseous phases, the gaseous phase being treated and recycled as shown in FIGURE 1. The liquid phase is conducted to fractionator 36 in a similar fashion and again naphtha fractions are withdrawn, in this case through line 140. The gas recycle system associated with hydrocracker 27 is modified slightly so that hydrogen may be sent from that system through lines 138 and 139 to join with the naphtha fractions in line 140. The combined stream of hydrogen and naphtha fractions passes through heater 141 wherein they are heated to the desired operating temperature, and are then introduced via line 142 into hydrocracker 43, which contains the relatively small pore crystalline zeoline selective hydrocracking catalyst of the type hereinbefore described. The operating conditions in hydrocracker 43 are again within the aforementioned ranges and are sufficient to obtain the desired degree of selective hydrocracking of straight chain hydrocarbons. The effluent from hydrocracker 43 is withdrawn through line 144, and passes to gas separator 145, which serves to separate the liquid and gaseous phases. The separated hydrogen stream is recycled to hydrocracker 43 by means of line 147, with makeup hydrogen being introduced through line 148. Stabilized naphtha product is withdrawn from gas separator 145 through line 146. The fractionator 36 bottoms, which represents material boiling above the naphtha range, is recycled back to hydrocracker 27 by means of line 39, after joining with the hydrofined oil feed from line 20. The process is thus characterized by a recycle to extinction of the fractionator 36 bottoms which are ultimately converted to lower boiling product.

FIGURE 3 illustrates another embodiment of the process of the invention wherein the total first stage hydrocracker effluent is introduced to the second stage selective hydrocracking, and wherein the second stage effluent is fractionated to separate naphtha fractions, with the fractionator bottoms being recycled back to the large pore catalyst in the first stage. Referring to FIGURE 3, the hydrofining section is again not shown, it being the same as illustrated in FIGURE 1. The hydrofined feed passes via line 21 into heater 23, after having been mixed with incoming hydrogen from line 22. The heated stream of feed and hydrogen enters hydrocracker 27 through line 24, and flows downwardly over the relatively large pore crystalline zeolite hydrocracking catalyst of the type hereinbefore described. The hydrocracking operating conditions in hydrocracker 27 are sufficient to obtain the desired degree of conversion per pass. The total effluent stream from hydrocracker 27 is withdrawn through line 228, and directly introduced into hydrocracker 43 which contains the relatively small pore crystalline zeolite selective hydrocracking catalyst of the type hereinbefore described. Recycle hydrogen joins with the first stage effluent through line 57 prior to introduction into hydrocracker 43. The operating conditions in hydrocracker 43 are sufficient to obtain the desired degree of selective hydrocracking of straight chain hydrocarbons. The effluent from hydrocracker 43 is withdrawn through line 44, and passes to gas separator 45 which serves to separate the liquid and gaseous phases. The gaseous phase including hydrogen, ammonia and hydrogen sulfide, passes through line 46 into gas treater 52, wherein hydrogen sulfide and ammonia are removed by scrubbing or other suitable means. The remaining gas stream composed substantially of hydrogen is recycled to hydrocracker 43 via line 54, joins with makeup hydrogen from line 55, and is heated in heater 56. The liquid phase from gas separator 45 is conducted via line 47 to fractionator 48, wherein light hydrocarbons ($C_4$ and lighter) are removed as overhead through line 49, and naphtha product is removed through line 50. The bottoms product from fractionator 48 (e.g. boiling above about 430° F.) is withdrawn through line 51 and recycled back to hydrocracker 27, after joining with the hydrofined feed stream from line 20. This embodiment of the process is thus characterized by a recycle to extinction of the fractionator 48 bottoms which are ultimately converted to lower boiling product.

It is to be understood that the process as described is not to be limited to the specific embodiments described. For example, while the above embodiments have included two hydrocracking stages with different hydrocracking catalysts used in each stage, it will be realized that additional stages may be included. Thus, a train of reactors may be utilized in place of hydrocracker 43 wherein the last reactor in the train will contain the relatively small pore size catalyst and wherein the initial reactors contain the relatively large pore size catalyst. Furthermore, while the embodiment of FIGURE 1 has been described with reference to two separate fractionators, one for each hydrocracker, it will be realized that a single fractionation system may be employed with the combined product streams from the two hydrocrackers. A dual fractionation will be preferred, however, in order that the highly aromatic gas oil fractions from hydrocracker 27 be recycled back to that hydrocracker which is primarily designed for the hydrocracking of aromatics. Similarly, the separate fractionator associated with hydrocracker 43 will ensure optimum conversion of straight chain hydrocarbons in hydrocracker 43. It will be further understood that although hydrocracker 27 has been illustrated as a single reaction zone, additional reactors containing the relatively large pore size crystalline zeolite catalyst may be employed in series with hydrocracker 27 to achieve various degrees of conversion. Additionally, while the relatively large pore and relatively small pore zeolite catalysts have been shown to be segregated in separate hydrocracking reactors, it is also within the contemplation of the present invention to employ a mixture of the two in the same reactor, with each type of catalyst performing its unique function. Furthermore, it will be understood that the zeolite catalysts hereinbefore described can be combined with or incorporated into various inorganic binders or matrices which may or may not exhibit catalytic behavior of their own.

The invention will be further understood by reference to the following examples which are given for illustrative purposes.

EXAMPLE 1

Preparation of catalysts (a) *Preparation of relatively large pore size crystalline zeolite hydrocracking catalyst.*—Part (a) of this example illustrates a typical procedure for preparing a hydrocracking catalyst suitable for use in the first stage of the process of the present invention.

A crystalline alumino-silicate zeolite having a silica to alumina mole ratio of about 5, uniform pore openings of about 13 A., and an X-ray diffraction pattern similar to the mineral faujasite is prepared by reacting sodium hydroxide, alumina, silica, and water, all supplied from suitable source materials, by procedures well known in the art. The zeolite product is then successively converted to the ammonium form and then partially to the magnesium form by conventional ion-exchange procedures. The first ion-exchange step utilizes ammonium hydroxide and ammonium chloride solutions in order to replace about 90 wt. percent of the sodium content of the product with ammonium ion. Subsequent to the ammonium ion exchange the product is treated with magnesium sulfate solution to produce a product containing about 2 wt. percent magnesium. The ammonium-magnesium sieve product is then impregnated with palladium by slurrying the product in water and adding a sufficient quantity of ammoniacal palladium chloride solution to produce about 0.5 wt. percent palladium in the final product. The catalyst is then washed, dried in air, pilled, and finally calcined in air for 16 hours at 1000° F. The product obtained is the hydrogen-magnesium form of the synthetic faujasite type of crystalline zeolite impregnated with palladium, the hydrogen form being produced by liberation of ammonia during the calcination step.

(b) *Preparation of relatively small pore size hydrocracking catalyst.*—A crystalline zeolite hydrocracking catalyst having uniform pore openings of about 5 A. was prepared as follows:

A charge of 500 grams of commercial sodium "zeolite A" (supplied by the Linde Division of the Union Carbide Corporation) having pore openings of about 4 A. was suspended in 2000 cc. of water and a solution containing one pound of zinc chloride in 500 cc. of water was added slowly with good stirring at ambient temperature. Agitation was continued at ambient temperature for at least 4 hours. The suspension was allowed to settle, the mother liquor was removed by filtration. This procedure was performed on the wet solids two more times so that the total number of exchanges was three. After the third exchange the product was water washed by reslurrying in about 2000 cc. of water for about one hour followed by removal of the wash liquid by filtration. The wash was repeated two times and the product dried. Analysis of the product showed 0.83 wt. percent sodium, 20.8 wt. percent zinc, 38.1 wt. percent $SiO_2$, and 30.8 wt. percent $Al_2O_3$. The product was then combined with palladium by adding 133 cc. of an ammoniacal palladium chloride solution having a palladium content of 37.5 milligrams per cc. to 500 grams of product suspended in water. The final catalyst, after drying, had a palladium content of 0.89% and was pelleted and charged to a small pilot plant reactor where it was heated in a hydrogen stream at atmospheric pressure and 850° F. The above catalyst was finally sulfactivated by contact with a heavy naphtha feed containing an appreciable amount of sulfur, e.g. .16 wt. percent.

(c) *Use of the above catalysts for hydrocracking.*—The above catalysts, i.e. a hydrogen magnesium synthetic faujasite and a palladium zinc 5A. zeolite, were utilized for the successive hydrocracking of a blend of thermal and catalytic cycle gas oil, in substantial accordance with the process scheme shown in FIGURE 2. The feed had an original nitrogen content of 120 p.p.m., a sulfur content of 4500 p.p.m., a boiling range of 400–725° F., and an API gravity of 28°. After the hydrofining stage, the nitrogen content was reduced to less than 20 p.p.m., and the sulfur content to less than 10 p.p.m. Hydrofining was accomplished with a cobalt molybdate on alumina catalyst containing about 16.5 wt. percent cobalt molybdate (3.9 wt. percent CoO, 12.6 wt. percent $MoO_3$), at a temperature of 700° F., a space velocity of 0.5 v./v./hr., a pressure of 1000 p.s.i.g., and a hydrogen rate of 5000 s.c.f./b.

The hydrofined gas oil feed was then successively hydrocracked with the above-described relatively large pore zeolite catalyst and relatively small pore zeolite catalyst, as shown in FIGURE 2; i.e. the naphtha fractions present in the hydrocracked liquid product from the relatively large pore zeolite catalyst were separated by distillation and subsequently processed over the relatively small pore hydrocracking catalyst. The following table summarizes the process conditions, liquid naphtha yield, and naphtha product quality for each of the two catalysts:

TABLE I.—HYDROCRACKING PROCESS WITH A DUAL CATALYST SYSTEM

|  | Large Pore Zeolite Catalyst | Small Pore Zeolite Catalyst |
|---|---|---|
| Process Conditions: |  |  |
| Temperature, °F | 680 | 725 |
| Pressure | 1,500 | 1,000 |
| V./v./hr | 1.5 | 0.5 |
| Hydrogen Rate, s.c.f./bbl | 5,000 | 5,000 |
| Liquid Naphtha, Yield, Vol. Percent | ¹ 113 | 99 |
| Inspection on $C_5+$ Product: |  |  |
| RON+3 cc. TEL | 89.8 | 90.9 |
| MON+3 cc. TEL | 85.8 | 91.6 |
| Gravity, °API | 54.1 | 53.6 |

¹ Yield based on recycle to extinction of fractionator bottoms.

As indicated above, selective hydrocracking of the previously hydrocracked product with the relatively small pore catalyst resulted in an increase in naphtha quality as indicated by octane number improvement. The indicated increase of 1.1 in octane rating is considered to be significant.

EXAMPLE 2

The catalysts and feed of Example 1 were utilized in the hydrocracking processing scheme illustrated in FIGURE 3, except that once-through operation was used; i.e. the 430° F. + fractionator bottoms were not recycled to hydrocracker 27. The hydrofining and first stage hydrocracking conditions were essentially the same as in Example 1. The following conditions were employed in the second hydrocracking stage using the relatively small pore zeolite catalyst: temperature, 850° F.; space velocity, 1.0 v./v./hr.; pressure, 1000 p.s.i.g.; exit hydrogen rate, 2000 s.c.f./bbl. In this case, therefore, the total hydrocracked effluent from the first stage containing any unreacted feed was passed over the relatively small pore size zeolite catalyst. The results of this run are summarized in the following table, wherein the analysis and naphtha inspections before and after the second stage selective hydrocracking are indicated.

TABLE II.—SELECTIVE HYDROCRACKING OF PREVIOUSLY HYDROCRACKED FEED

|  | First Stage Hydrocracked Product | |
|---|---|---|
|  | Before Second Stage Small Pore Catalyst | After Second Stage Small Pore Catalyst |
| Analysis, Wt. percent: |  |  |
| $C_4$ and Lighter | 1.0 | 8.7 |
| $C_5$ | 2.0 | 3.2 |
| $C_5$–430° F.+ | 38.7 | 44.1 |
| 430° F.+ | 60.3 | 47.2 |
| Inspections, $C_5$–430° F. Naphtha: |  |  |
| Gravity, °API | 45.3 | 49.0 |
| Octane Numbers: |  |  |
| RON +3 cc. TEL | 99 | 100 |
| MON +3 cc. TEL | 88 | 89.3 |

As indicated in the above table, contact of the previously hydrocracked feed with the relatively small pore size zeolitic catalyst again achieved an improvement in octane rating of naphtha fractions contained therein. Additionally, a net of 5.4% of the feed was converted to naphtha as indicated by the increase in $C_5$–430° F. yield from 38.7 to 44.1 wt. percent. It is concluded that contact of the total hydrocracked product from the first stage relatively large pore zeolite catalyst, with a relatively small pore size zeolitic hydrocracking catalyst will provide a $C_5$–430° F. naphtha of improved yield and octane number.

EXAMPLE 3

As indicated in Example 1, the relatively small pore zeolite catalyst used in the second stage for the selective hydrocracking of straight chain hydrocarbons was sulfactivated by contact with a sulfur-containing feed prior to its use in the selective hydrocracking zone. In order to demonstrate the desirability of sulfactivation, a run was performed using the same relatively small pore catalyst used in the previous examples, but without sulfactivation. The processing scheme used in Example 2 (which was performed on a once-through basis) was instead run on a recycle basis substantially as illustrated by FIGURE 3 if reactor 43 was absent and recycle gas from line 54 went to line 22. During this recycle processing run, the total hydrocracked effluent from reactor 27, containing a large pore zeolite catalyst, was withdrawn, analyzed, and then passed over the relatively small por 5 A. selective hydrocracking catalyst of the previous examples which was not sulfactivated. The conditions employed included 1000 p.s.i.g., 1.5 v./v./hr., 6000 c.f./b. exit hydrogen rate, and the three different temperatures shown below. The following table summarizes the feed analysis and the results obtained at the three temperature levels.

TABLE III.—SELECTIVE HYDROCRACKING OF PREVIOUSLY HYDROCRACKED FEED

|  | Feed | Temperature, °F. | | |
|---|---|---|---|---|
|  |  | 650 | 725 | 850 |
| Analysis, wt., percent: |  |  |  |  |
| $C_5$–430° F. Naphtha | 53.5 | 52.4 | 55.3 | 62.6 |
| 430° F.+ | 45.1 | 46.0 | 42.8 | 29.0 |
| $C_5$–430° F., Octane Rating: |  |  |  |  |
| RON +3 cc. TEL | 86.6 | 86.9 | 86.1 | 86.1 |
| MON +3 cc. TEL | 88.2 | 88.4 | 87.0 | 88.4 |

As indicated, very little, if any, selective hydrocracking of straight chain paraffins occurred. The octane number before and after hydrocracking remained relatively constant and the extent of hydrocracking was substantially reduced from that of previous examples.

In summary, it may be concluded that the process of the present invention provides a valuable means for improving the quality of naphtha fractions normally present in a previously hydrocracked feed stream in a manner not hitherto appreciated. By following the teachings of the present invention, numerous advantages may be realized. Among these may be mentioned the following:

(1) The production of a higher octane naphtha product;

(2) The elimination of the necessity for reforming hydrocracked product streams in order to upgrade naphtha fractions;

(3) The achievement of high octane level in the $C_5$–430° F. naphtha cut which results in appreciable octane barrels advantage;

(4) Prevention of naphtha degradation in subsequent steps such as reforming by optional segregation of naphtha fractions from each hydrocracking stage.

What is claimed is:

1. A process for hydrocracking a hydrocarbon feed which comprises contacting said feed at hydrocracking conditions in the presence of added hydrogen, in a first hydrocracking zone, with a catalyst comprising a crystalline alumino-silicate zeolite combined with a platinum group metal, said zeolite having uniform pore openings of about 6 to 15 A. and containing less than 10 wt. percent alkali metal oxide; and contacting at least a portion of the normally liquid effluent from said first hydrocracking zone at hydrocracking conditions in the presence of added hydrogen, in a second hydrocracking zone, with a catalyst comprising a platinum group metal combined with a zinc-containing crystalline alumino-silicate zeolite having uniform pore openings of about 5 A.

2. The process of claim 1, wherein the zeolite component of said first hydrocracking zone catalyst has been base exchanged with a cation selected from the group consisting of hydrogen-containing cations, magnesium cations, and mixtures thereof.

3. The process of claim 1, wherein said platinum group metal is palladium.

4. The process of claim 1, which additionally comprises contacting said second hydrocracking zone catalyst with sulfur.

5. A process for hydrocracking a hydrocarbon feed which comprises contacting said feed at hydrocracking conditions in the presence of added hydrogen, in a first hydrocracking zone, with a catalyst comprising a crystalline alumino-silicate zeolite combined with a platinum group metal, said zeolite having uniform pore openings of about 6 to 15 A. and containing less than 10 wt. percent alkali metal oxide by virtue of its having been base-exchanged with a cation selected from the group consisting of hydrogen-containing cations, magnesium cations, and mixtures thereof; and contacting at least a portion of the normally liquid effluent from said first hydrocracking zone at hydrocracking conditions in the presence of added hydrogen, in a second hydrocracking zone, with a sulfactivated catalyst comprising a platinum group metal combined with a zinc-containing crystalline alumino-silicate zeolite having uniform pore openings of about 5 A.

6. The process of claim 5, wherein the total normally liquid effluent from said first hydrocracking zone is contacted with said second hydrocracking zone catalyst.

7. The process of claim 5, wherein said portion of said normally liquid effluent from the first hydrocracking zone which is contacted with said second hydrocracking zone catalyst consists essentially of naphtha fractions.

8. The process of claim 5, wherein said portion of said normally liquid effluent from the first hydrocracking zone which is contacted with the said second hydrocracking zone catalyst consists essentially of hydrocarbon fractions boiling above the range of naphtha fractions.

9. A process for hydrocracking a hydrocarbon feed containing straight chain and nonstraight chain hydrocarbons which comprises contacting said feed at hydrocracking conditions in the presence of added hydrogen in a first hydrocracking zone, with a catalyst comprising a crystalline aluminosilicate zeolite combined with a metallic hydrogenation component, said zeolite having uniform pore openings of about 6 to 15 A., and containing less than 10% by weight of alkali metal oxide; and contacting at least a portion of the normally liquid effluent from said first hydrocracking zone at hydrocracking conditions in the presence of added hydrogen, in a second hydrocracking zone, with a catalyst comprising a Group VIII metallic hydrogenation component combined with a crystalline aluminosilicate zeolite containing a Group II metal and having uniform pore openings of about 5 A., wherein the metal in said metallic hydrogenation component is in a form selected from the group consisting of the free metal, oxide, sulfide and a mixture thereof, and wherein said zeolite has been base exchanged with a cation to reduce its alkali metal content to less than 10 wt. percent.

10. The process of claim 9 wherein said metallic hydrogenation component is in said second zone is a platinum group metal.

11. The process of claim 10, wherein said platinum group metal is palladium.

12. The process of claim 9, wherein the zeolite component of said first hydrocracking zone catalyst is "zeolite Y."

13. A process for hydrocracking a hydrocarbon feed containing straight chain and nonstraight chain hydrocarbons which comprises contacting said feed in a first hydrocracking zone in the presence of added hydrogen, with a catalyst comprising a crystalline aluminosilicate zeolite of the synthetic faujasite variety having a silica to alumina molar ratio of about 3 to 6, an alkali metal oxide content less than 10 wt. percent and uniform pore openings of about 6 to 15 A., said zeolite being combined with a platinum group metal in an amount between 0.01 and 5.0 wt. percent based on the zeolite, said first hydrocracking zone being maintained at a temperature of from about 400° F. to 800° F., a pressure of from about 250 to 2500 p.s.i.g., a liquid hourly space velocity of from about 0.2 to 2 volumes of feed per volume of catalyst per hour, with a hydrogen feed rate of from about 1000 to about 20,000 s.c.f./bbl. of feed; and contacting at least a portion of the normally liquid effluent from said first hydrocracking zone, in the presence of added hydrogen, in a second hydrocracking zone with a catalyst comprising a crystalline aluminosilicate zeolite having uniform pore openings of about 5 A. and combined with 0.1 to 2 wt. percent platinum group metal, said 5 A. zeolite having been base exchanged with zinc cation to reduce its alkali metal oxide content to below about 5 wt. percent, said second hydrocracking zone catalyst further containing about 0.5 to 15 wt. percent sulfur, wherein the hydrocracking conditions in said second zone include a temperature of from about 650° F. to 900° F., a pressure of from about 200 to 2500 p.s.i.g., a liquid hourly space velocity from about 0.2 to 2 volumes of feed per volume of catalyst per hour, and a hydrogen feed rate of from about 1000 to about 10,000 s.c.f./bbl. of feed; and wherein both of such hydrocracking zones are operated at essentially the same pressure.

14. The process of claim 13 wherein said portion of said normally liquid effluent from the first hydrocracking zone which is contacted with said second hydrocracking zone catalyst consists essentially of naphtha fractions, and wherein the normally liquid effluent from said second hydrocracking zone is blended directly into gasoline product.

15. The process of claim 9 wherein the zeolite component of said first hydrocracking zone catalyst has been base exchanged with a cation selected from the group consisting of hydrogen-containing cations, magnesium cations, and mixtures thereof.

16. The process of claim 9, wherein the zeolite component of said second hydrocracking zone catalyst has been base exchanged with zinc cation.

17. The process of claim 9, which additionally comprises contacting said second hydrocracking zone catalyst with sulfur.

References Cited

UNITED STATES PATENTS

| | | | |
|---|---|---|---|
| 3,114,696 | 12/1963 | Weisz | 208—66 |
| 3,039,953 | 6/1962 | Eng | 208—26 |
| 3,132,087 | 5/1964 | Kelley et al. | 208—60 |
| 3,236,762 | 2/1966 | Rabo et al. | 208—111 |
| 3,240,697 | 3/1966 | Miale et al. | 208—120 |

ABRAHAM RIMENS, *Primary Examiner.*

DELBERT E. GANTZ, *Examiner.*